United States Patent [19]

Bassett et al.

[11] 4,000,835
[45] Jan. 4, 1977

[54] WINDSHIELD WASHER SERVICE APPARATUS

[76] Inventors: Walter D. Bassett, 5887 Shimer Ave., Indianapolis, Ind. 46219; Terry J. Bassett, Rte. No. 3, Monticello, Ind. 47960

[22] Filed: Sept. 12, 1975

[21] Appl. No.: 612,642

[52] U.S. Cl. ................................. 222/183; 222/529
[51] Int. Cl.² .......................................... B67D 5/60
[58] Field of Search .................. 222/105, 183, 529

[56] References Cited

UNITED STATES PATENTS

| 2,582,752 | 1/1952 | Harr | 222/183 X |
| 3,089,622 | 5/1963 | Westlake, Jr. | 222/183 |
| 3,128,914 | 4/1964 | Bertrand | 222/183 X |
| 3,199,742 | 8/1965 | Hill | 222/529 X |
| 3,325,058 | 6/1967 | West, Jr. | 222/183 X |

*Primary Examiner*—Stanley H. Tollberg
*Attorney, Agent, or Firm*—Jenkins, Hanley & Coffey

[57] ABSTRACT

Automotive windshield wiper fluid is dispensed from a multiple-charge replaceable container in a cabinet mounted in elevated position beside a service station driveway and provided with a gravity-feed hose having a manual flow controller at its free end. The cabinet has sides and top forming a weatherproof enclosure and has an open bottom to receive an upwardly-inserted 5-gallon container consisting of a carton having therein a collapsible plastic bladder with a bottom outlet fitting to which the hose is attached. A bottom shelf at the front of the bottom opening supports the carton from below when in mounted position, and a sloping wall at the top of the rear side cams the top of the carton forward as it approaches mounted position so as to support the container in vertical position in the cabinet. A slot in the shelf clears the hose connection. The cabinet is readily detachable from its mounting for removal to inside storage when the service station is closed.

8 Claims, 4 Drawing Figures

WINDSHIELD WASHER SERVICE APPARATUS

This invention relates to apparatus for dispensing windshield washer fluid to windshield washer tanks on automotive vehicles.

Windshield washers are important safety equipment which are widely used on automotive vehicles. Their safety function, however, can be performed only when their fluid reservoirs contain fluid, and keep-fill service is not generally available.

While washer-fill service may be included in services performed by some service organizations when cars are brought in for periodic oil change and the like, such is not universally the case, and oil change periods, especially in modern cars, may be too widely spaced to provide adequate keep-fill service for the windshield washers. In the past, washers have been filled by the car owner or at his request by filling station personnel with the use of a concentrate which is first added to the reservoir and then diluted with water. This tends to be inconvenient and wasteful and does not provide the most desirable fluid composition. Desirable compositions contain a high proportion of volatile solvent to provide a low freezing point and good cleaning action, and such compositions are desirably pre-mixed and protected from evaporation. Recently, pre-mixed washer fluid has become available in gallon jugs and the like, and while such jugs provide good protection for the fluid their use is not satisfactory except for persons who regularly perform routine services on their own automotive vehicles.

The present invention makes windshield washer service readily available at service islands where vehicles normally stop for other service such as replenishment of fuel. It provides a simple and convenient means of quickly filling washer reservoirs as part of routine services normally performed as the fuel is being supplied. The invention also provides washer service apparatus which meets the particular and demanding requirements of automotive service station environments, such as exposure to all kinds of weather and the necessity for safeguarding the equipment when the service station is closed.

In other liquid-handling fields it is known to employ a liquid shipping container in the form of a corrugated board carton containing a collapsible bladder of five-gallon capacity and having a fill and outlet fitting accessible through a tear-out window at one end of the carton. Such containers provide an inexpensive and convenient means of shipping and handling liquid, and are of a convenient size and weight for shipping and can readily be handled by shipping and service personnel. However, such containers are fragile, require careful handling, and are not suited to outdoor exposure or for use as such in filling stations.

The present invention utilizes such a liquid container to package pre-mixed windshield fluid. The 5-gallon capacity of such containers is sufficient to provide multiple charges or fillings of automotive windshield washer reservoirs, and the invention makes feasible their use in filling stations and makes multiple charge quantities available directly at the service island where automotive vehicles normally stop for fuel.

In accordance with the present invention, a weatherproof cabinet is mounted in an elevated position beside a service station driveway and contains a multiple-charge replaceable container of pre-mixed windshield washer fluid, desirably a 5-gallon carton container as described above in which the volatile fluid is entirely enclosed in an imperforate bladder mounted in an inexpensive shipping carton. Such bladder and shipping carton are used as such in the cabinet. A gravity-feed hose is connected to an outlet fitting on the bladder, and has a shut-off device or other flow controller at its free end.

The preferred bladder and carton container is mounted with its outlet fitting at the bottom and the hose is connected to such fitting and drains from the bottom, but a siphon arrangement could also be used. The preferred cabinet has sides and a top forming a weatherproof enclosure, and has an opening at the bottom through which the fluid container can be inserted upwardly so that it is wholly enclosed at the sides and top by the weatherproof enclosure. Means is provided to releasably retain the container in the cabinet, and this preferably consists of a shelf at the front of the bottom of the cabinet onto which the bottom of the container is moved horizontally for support when fully inserted in the cabinet. Desirably, means is provided at the opposite wall of the cabinet to move the top of the container horizontally in the same direction as the bottom so that the container is supported in a vertical position. Such means is desirably a sloping wall which cams the top of the carton in such direction when the container approaches its mounted position. The outlet fitting of the container is preferably positioned at the bottom of the cabinet, at the junction between the bottom and side wall of the container carton where the carton is supported by the shelf, and the shelf and its adjoining cabinet wall are provided with a notch opening to permit movement of the hose and outlet fitting to a position in which the hose projects through the notch in the side wall or the shelf and the outlet is supported by the shelf.

The accompanying drawing illustrates the invention and shows a preferred embodiment. In such drawing.

Figure 1:
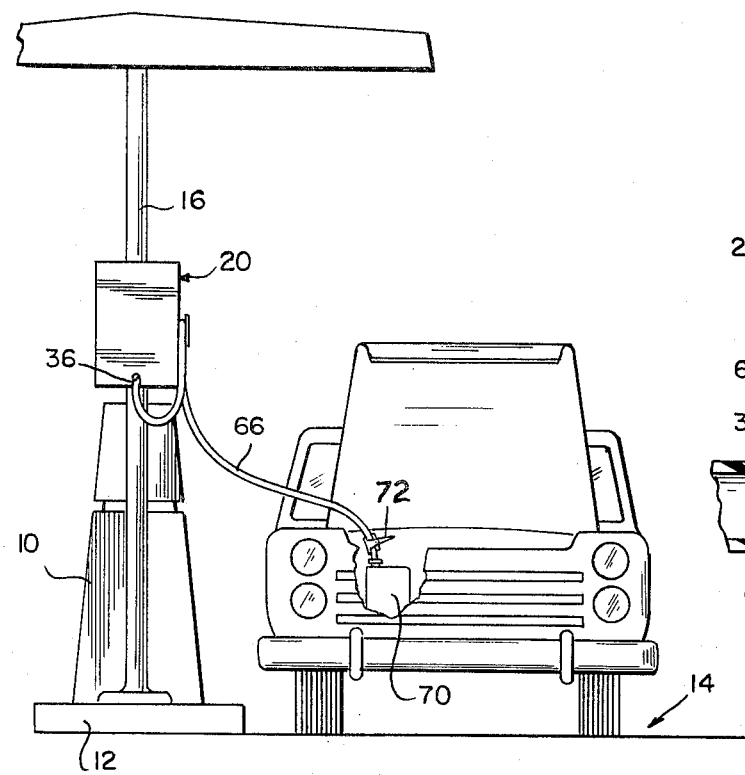
FIG. 1 is a pictorial view showing apparatus in accordance with the invention mounted at a gasoline service island.
Figure 2:
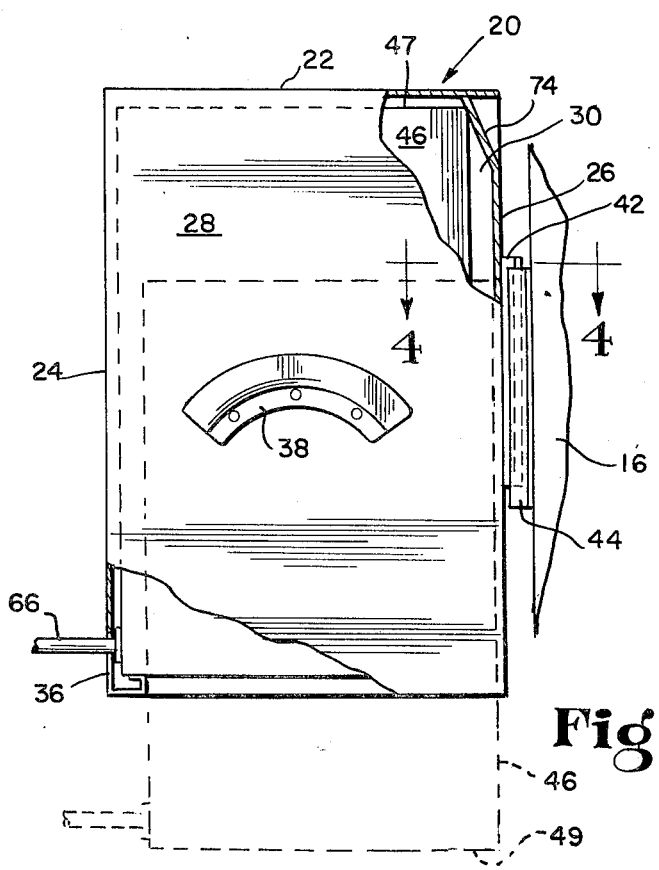
FIG. 2 is a side elevation of the cabinet shown in FIG. 1, with parts broken away.
Figure 4:
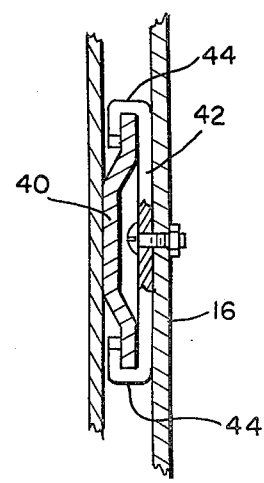
FIG. 4 is a sectional view on the line 4—4 of FIG. 2.

The service island shown in FIG. 1 comprises a gasoline dispensing stand 10 mounted on an island base 12 adjacent a driveway 14 for vehicles to be serviced. A post 16, which may be a lamp post conventionally present at a service island, is also mounted on the island base 12. In accordance with the present invention, a cabinet 20 is mounted at an elevated position at the service island, and, by way of example, is shown mounted on the post 16, which is a convenient mounting when such a post is present. As shown in FIG. 2, the cabinet comprises a top wall 22 and side walls, including a front wall 24, a rear wall 26, and two side face walls 28 and 30. These are integrally joined and sealed together to form a weatherproof enclosure. The cabinet is mounted on the post 16 by a mounting assembly which permits ready removal of the cabinet. As shown, this comprises a tapered bracket 40 fixed to the rear wall 26 of the cabinet, and a holder 42 fixed to the post 16 or other support and provided with facing channels 44 which receive the edges of the tapered bracket 40.

Figure 3:
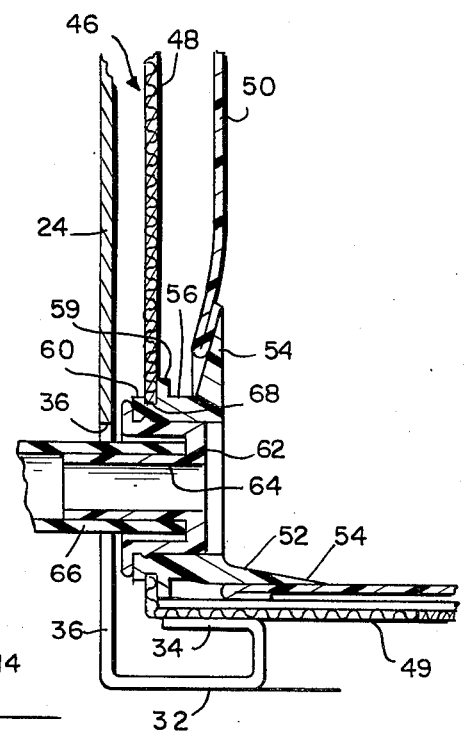
FIG. 3 is a fragmental sectional view, on a substantially enlarged scale, showing the construction of the carton and bladder container and its outlet fitting, and showing the cabinet support for the container.

The bottom of the cabinet is generally open, but as shown in FIGS. 2 and 3, the front wall 24 is joined at the bottom by an inturned flange 32 which is bent upward and then forward to form a shelf 34 for supporting the front lower edge of the container 46 described below. The shelf 34 and the lower portion of the wall 24 are cut away at the middle to form a downward-open notch 36 for purposes explained below. One side face wall 28 of the cabinet carries a hose bracket 38 for storage of the hose described below.

The cabinet is adapted to contain a liquid container 46 which consists of an outer rectangular carton 48 formed in a conventional manner from corrugated board and having side walls including a front wall 48, and end walls 47 and 49. As shown in FIG. 3, the end wall 49 is formed of overlapping panels integral with the side walls and folded inward into overlapping relation to provide a double thickness. The carton houses a bladder 50 formed of thin flexible plastic sheet material and having a fill and outlet fitting 52. For shipping, the end wall 49 is the top wall so that the fitting 52 is at the top of the container. The fitting 52 is a molded plastic unit having a skirt 54 which is fixed and sealed to the edges of an opening in the bladder 50, and having a tubular body 56 which is preferably shaped with a pair of spaced flanges 59 and 60 defining an intermediate groove. When the container is arranged for mounting in the cabinet 20 and delivery of its contents, the tubular body 56 of the fitting 52 receives a plug 62 formed with a nipple 64 to which a small flexible hose 66 is attached.

For shipping, the fitting is closed by a suitable closure (not shown), which may be applied to the nipple 64 or may replace the dispensing plug 62 in the body 56 of the fitting. The closed fitting 52 is normally housed within the carton 48 and lies proximate to the juncture between the front wall 48 of the carton and the double end wall 49, which is normally the top wall. At that juncture, the carton is formed with a tear-out strip to form a window through which access to the fitting 52 may be obtained and which forms a slot 68 in the front wall 48 of the carton, of a width to be received in the groove between the spaced flanges 59 and 60 on the fitting 52.

To convert the container 46 from a shipping container to a dispensing container and mounting it in the cabinet, the tear strip of the carton 48 is removed to provide access to the closed fitting 52, the closure plug of the fitting is removed, and the delivery plug 62, if not already present, is installed, and the hose 66 is attached to such delivery plug. The fitting 52 is then pressed into engagement with the edges of the notch 68 in the front wall of the carton, and this locates the fitting 52 in the position shown in FIG. 3. The carton is then inverted so that the fitting 52 and end wall 49 are at the bottom, and the inverted carton is then inserted vertically upward into the cabinet 20 through its open bottom and behind the shelf 34. As the carton approaches its mounted position, its rear corner strikes a sloping wall 74 at the top of the rear wall 26 of the cabinet, which cams the top end of the carton horizontally forward toward the front wall 24. When the carton has been fully raised, its bottom wall 49 will clear the shelf 34, and the bottom of the carton is then moved horizontally forward and rested on the shelf 34. The carton will then be supported in a substantially vertical position by the shelf 34 and the sloping wall 74 at the opposite corner of the cabinet. In the insertion movement of the carton, the hose 66 and the plug 62 to which it is connected pass through the notch 36 in the shelf 34 and the lower edge of the front wall 24 and moves to the position shown in FIG. 3, where the hose 66 projects forward from the bottom of the cabinet.

As shown in FIG. 1, the hose is of sufficient length to extend from the cabinet 20 to the reservoir 70 of a windshield washer of an automotive vehicle stopped at the driveway 14. The hose normally has a shut-off valve or clamp 72 at its free end, which is normally closed and is adapted to be manually opened when it is desired to dispense washer fluid from the cabinet 20 to the reservoir 70. The hose bracket 38 provides convenient storage for the long hose 66 when the fluid dispensing cabinet is not in use.

Either the container 46 itself or the container and its cabinet 20 are readily removable for safe inside storage when the service station is closed, and are of a size and weight which is readily handled by service personnel.

Dispensing use of the apparatus is extremely simple. All that is necessary is for the attendant or customer to remove the hose 66 from its bracket 38, extend the hose 62 to the washer reservoir 70 of the vehicle, and actuate the nozzle or flow controller 72 at the end of the hose to deliver sufficient washer fluid to the reservoir to fill that reservoir. Flow is then shut off and the hose returned to the bracket. The operation takes only a very short time especially when the hood of the vehicle has been raised for other routine service.

The five-gallon capacity of the container 46 provides multiple charges or fillings for such service, and the liquid contained in the bladder 50 within the carton 48 is wholly enclosed and protected from evaporation and from contamination. Moreover, the carton 48 is itself protected from the weather by the weatherproof enclosure formed by the cabinet 20 so that it can be used continuously over a period amply long enough for its contents to be dispensed. The containers are disposed of or recycled or may be refilled when their contents have been used.

The washer fluid dispensing apparatus described provides a convenient means of routinely filling the windshield washer reservoir of automotive vehicles as part of the routine service performed when the vehicles stop for fuel at the service island, and provides an additional service which the station operator can provide either free or for a small charge. The cabinet 20 is out in a prominent position where both the vehicle owner and the service station operator will be reminded of the need for servicing this important safety equipment. The invention facilitates and encourages regular servicing of washers and thus promotes the safety which they provide.

We claim:

1. Apparatus for dispensing automotive windshield wiper fluid, comprising a cabinet in the form of a box-like structure having side and top walls forming a weatherproof enclosure and having a bottom opening for insertion and removal from below of a liquid supply container, said cabinet mounted in elevated position at a service island adjacent a service station driveway at which washer-equipped automotive vehicles stop for other service, at a height such that liquid will readily flow by gravity to the washer equipment of such vehicles, a replaceable multiple-charge supply container of wiper fluid removably mounted in said cabinet through said bottom opening, means on the cabinet extending within the cabinet and adjacent said opening for supporting the container therein, an elongated gravity-feed hose connected to said container for dispensing fluid therefrom and having a manually operable flow controller at its free end, said hose being of sufficient length to extend to the washer reservoir of a vehicle stopped on said driveway and being connected to the container adjacent the bottom thereof so as to move into and out of operative position with the container as the container is inserted and removed through said bottom opening.

2. Apparatus as in claim 1 in which said container comprises a physically stiff carton of a size and shape to be inserted in the cabinet through said bottom opening, and having a collapsible bladder therein provided with an outlet fitting at one end of the carton connected to said hose.

3. Apparatus as in claim 1 in which the bottom of the cabinet is formed with a fixed container support along one edge, the bottom being otherwise open and providing an opening of sufficient size to allow the fluid container to be inserted vertically upward through the bottom opening, the bottom of the container being then moved horizontally to rest on the container support, and means for moving the top of the container in the same direction as the bottom so that the container is supported in substantially vertical position.

4. Apparatus as in claim 3 in which said last-named means comprises an inwardly positioned wall on the cabinet which is operative to cam the top of the container horizontally as the container is lifted to its supported position.

5. A dispensing cabinet for liquid containers of the type comprising a stiff rectangular carton containing a collapsible bladder having an outlet fitting accessible through an opening at one end of the carton, comprising a cabinet structure having side and top walls forming an enclosure for such a container, the bottom of said structure having a shelf along one edge thereof and being otherwise open, the arrangement being such as to allow the container to be inserted vertically upward through the bottom opening and then to have its bottom moved horizontally to rest at one edge on said shelf so as to be supported in the cabinet by such shelf, and means at the opposite side of the cabinet for causing the top of the container to move horizontally in the same direction as the bottom is moved to rest on the shelf, so that the container is supported in the cabinet in substantially vertical position.

6. A cabinet as in claim 5 in which said last-named means is an inwardly displaced cam surface disposed at the top of said opposite wall, which is engaged by the top of the container and cams the same horizontally as it is raised to final mounting position.

7. A cabinet as in claim 5, for containers in which the outlet fitting has a dispensing position in which it and a hose connected thereto project from adjacent the juncture of one side of the carton and said one end thereof, in which said cabinet contains a notch extending across said shelf in position to receive the projecting outlet fitting and hose on the container inserted in the cabinet, such notch being open toward the open bottom of the cabinet so as to freely pass the outlet fitting and hose to their dispensing position as the container is moved upward into the cabinet and then horizontally to supported position on the shelf in the cabinet, the arrangement being such that the fitting and hose are supported in the notch when the container is in its supported position.

8. A cabinet as in claim 7 in which the hose projects from the side of the carton adjacent the juncture of such side with one end of the carton, and said notch extends through the shelf and upward along the adjoining side of the cabinet.

* * * * *